May 6, 1952

F. KESSLER 2,595,388

TELEPHONE CONVERSATION TIMING MEANS

Filed Dec. 12, 1949

INVENTOR.
FRANK KESSLER

BY T. L. Bowes

ATTORNEY

Patented May 6, 1952

2,595,388

UNITED STATES PATENT OFFICE 2,595,388

TELEPHONE CONVERSATION TIMING MEANS

Frank Kessler, Rochester, N. Y., assignor to Stromberg-Carlson Company, a corporation of New York Application December 12, 1949, Serial No. 132,616

8 Claims. (Cl. 179—7.1)

Figures 1, 2, 3:
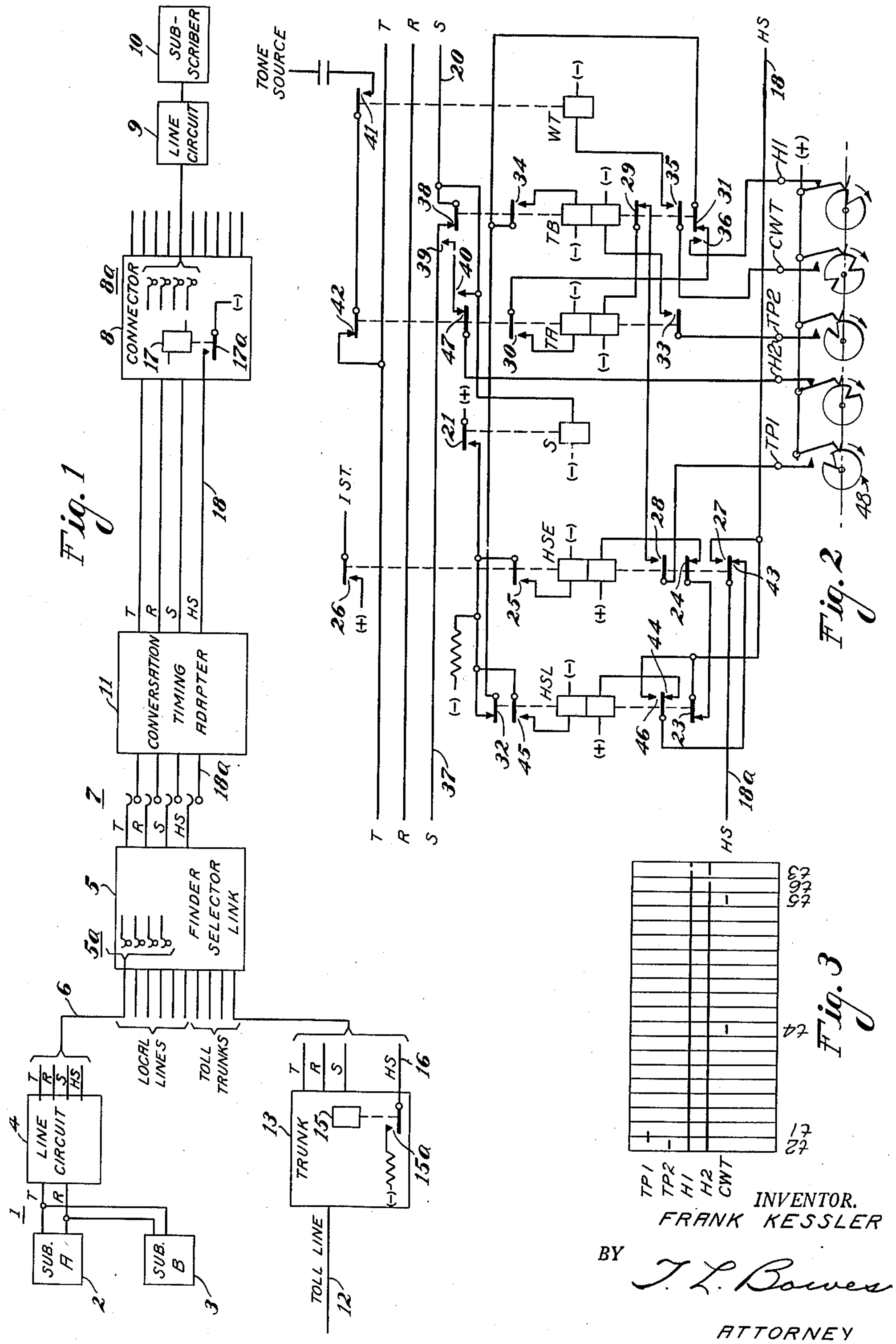

My invention relates to automatic telephone systems and more particularly to conversation timing means for use in automatic telephone systems.

In automatic telephone systems it is frequently desired to provide means for timing out certain calls a predetermined time after completion of a call. For example, it has been proposed to limit local calls to a predetermined length of conversation time but to permit toll calls to continue on an unlimited time basis.

It is an object of my invention to provide new and improved means for timing conversation in automatic telephone systems.

It is another object of my invention to provide new and improved conversation timing means which distinguishes between classes of calls and times only a desired class or classes of calls.

It is another object of my invention to provide conversation timing means utilizing a control conductor not only to control the timing function but also to provide answering supervision.

Other objects and advantages of my invention will be better understood from the following description of my invention.

In accordance with the preferred form of my invention, there is provided a conversation timing circuit or adapter in a suitable location in a telephone system as, for example, between a finder-selector link and a connector in a step-by-step system wherein a finder is employed to extend local as well as toll calls. A control conductor is extended from various line circuits and toll trunks to the connector. When a local line initiates a call, upon answering by the called party, battery potential is applied to the conductor to initiate timing of the conversation period. On toll calls, however, the forwarding operator applies battery potential to the control conductor and means are provided to disable or prevent the operation of the timing means. Thus, means are provided for distinguishing between local and toll calls, although the principles of my invention are equally applicable to providing means for distinguishing between any different groups of lines or calls according to the presence or absence of potential on the incoming control conductor (with respect to the conversation timing circuit), and the timing means operates to initiate measurement of the duration of a call in dependence upon a predetermined potential on the outgoing control lead.

For a detailed description of my invention, the following description may be read in connection with the drawings in which Fig. 1 shows in block diagram form a telephone system embodying the principles of my inventon, Fig. 2 is a schematic diagram of a conversation timing adapter or circuit for use in the system depicted in Fig. 1, and Fig. 3 illustrates the sequences of control potentials for use in the circuit of Fig. 2.

Referring to Fig. 1, there is indicated a local line 1 which may be a private line or a party line. A party line having substations 2 and 3 is illustrated. Line 1 is connected to a suitale line circuit 4. Means are provided for finding a calling line as, for example, a suitable finder-selector link indicated by the numeral 5 having a step-by-step switch indicated by the numeral 5a adapted to successively test terminals in a suitable bank in search of a marked line. Upon successfully finding the calling line, a suitable step-by-step switch indicated by the numeral 7 is caused to extend the call to a suitable connector 8 and the latter through a suitable step-by-step switch 8a extends the call to line circuit 9 and subscriber or substation 10. The details of the extension of a call form no part of my invention. Suitable circuits for such a system as that briefly described above are disclosed in a copending application Serial No. 743,415, filed April 23, 1947, now Patent No. 2,567,650, granted September 11, 1951, by Frank A. Morris and assigned to the same assignee as the present invention.

There is interposed between finder-selector link 5 and connector 8 a conversation timing circuit or adapter 11 embodying the principles of my invention, although the conversation timing circuit may be interposed at any desired point in the system.

Finder-selector link 5 is arranged to service not only local lines but also a predetermined number of toll trunks and thus provides service for two groups of lines, one comprising local lines which are to be limited with regard to length of conversation time and toll calls with respect to which unlimited conversation time is to be provided.

There is illustrated a toll line 12 connected to predetermined terminals in the finder bank by means of a suitable trunk circuit 13. In the arrangement illustrated in Fig. 1 that type of trunk circuit is indicated in which an operator, in response to a calling condition on toll line 12, forwards or extends the call over the toll line as by means of a suitable calling device such as a dial, not shown, but which, in a well-known manner, causes the operation of a suitable relay 15 to apply resistance battery to the HS or supervisory lead 16 extending to the finder-selector link through contacts 15*a*.

Referring to connector 8, there is indicated a suitable relay 17 arranged to be energized upon the answering of a call by subscriber 10 to apply battery through contacts 17*a* to the HS or supervisory conductor 18 back to the conversation timing adapter 11. Suitable circuits for trunk 13 and connector 8 are illustrated in copending application Serial No. 139,632, filed January 20, 1950, by William W. Pharis, and assigned to the same assignee as the present invention. Inasmuch as the details of these particular circuits form no direct part in my present invention, it is believed unnecessary to further illustrate or describe them. It may be mentioned, however, that relay 15 of trunk circuit 13 corresponds to relay SH1 in the incoming toll repeater, Figs. 3 and 4, of the aforementioned Pharis application, this last mentioned relay functioning to switch the HS lead to negative during each digit dialled and thus cause the connector to be switched from local to toll operation; and it may further be noted that relay 17 of connector 8 of the present application corresponds to relay AA, Fig. 5 in the connector of the Pharis application, this AA relay functioning upon answering by the called party to switch the HS lead to negative at the connector end and thus cause the incoming toll repeater to return answering supervision back over the toll trunk. These circuit functions are explained on pages 6, 7, and 52 of the Pharis application.

Referring to Fig. 2, the operation of my conversation timing circuit is first described in connection with a local call with respect to which it is desired to provide conversation timing. It is assumed that a call from line 1 has been extended through connector 8 at which location ground is applied to back sleeve lead 20, as is more fully described in the above-identified Morris application.

The appearance of ground on lead 20 energizes relay S over an obvious circuit. The operation of relay S provides a local ground through make contacts 21 of relay S.

As previously described in a general manner, when the extended call is answered by subscriber 10, battery is connected to HS lead 18. In the following description, it is to be understood that the positive potential of the direct current supply is connected to ground and is hereafter referred to as "ground" and the negative terminal of the direct current source is hereafter referred to as "battery." The appearance of battery on lead or conductor 18 is employed to energize relay HSE over a circuit extending from conductor 18 through break contacts 23 of relay HSL and break contacts 24 of relay HSE to the lower winding of relay HSE.

Relay HSE operates and locks up to the local ground through make contacts 25 of relay HSE; grounds the interrupter start lead IST through make contacts 26 of relay HSE (the interrupter constituting a source of control pulses, the time sequence of which is shown in Fig. 3; opens the above traced operating circuit to the lower winding of relay HSE at break contacts 24; transfers the back HS lead 18*a* from relay HSL to the forward or outgoing HS lead 18 at contacts 43, 27 of relay HSE so that a switch through connection free of all relay attachments in the adapter is now established between the two HS leads, this connection facilitating the transmission of signals over both HS leads in series if such signaling should be desired in this type of call; and connects timing lead TP1 to the lower winding of relay TA through make contacts 28 of relay HSE and break contacts 29 of relay TB, lead TP1 being connected to a suitable source of timing pulses and holding ground. Such a source is commonly a suitable multi-contact interrupter and any desired form may be used. In Fig. 2 there is shown a schematic arrangement represented as a plurality of switches disposed to be opened or closed, as the case may be, at suitable times to connect ground to the various leads as desired. For example, the switches can be operated by a suitable set of cams 48, these cams being mounted on a rotating shaft.

As a result of the last-described circuit, referring to Fig. 3, at time $t_1$ the appearance of a pulse of ground potential on lead TP1 causes energization of relay TA over the above-described circuit. Relay TA locks itself to local ground over a circuit extending from the winding of relay TA through make contacts 30 of relay TA, break contacts 31 of relay TB and break contacts 32 of relay HSL. The operation of relay TA also prepares a circuit for operating relay TB upon the receipt of the next ground pulse over lead TP2 at time $t_2$ upon the next revolution of the interrupter. Upon the receipt of the next pulse TP2 at time $t_2$ relay TB is operated over a circuit including make contacts 33 of relay TA and the lower winding of relay TB which locks up to local ground through make contacts 34 of relay TB.

Operation of relay TB opens the energizing circuit for relay TA at break contacts 29 of relay TB; connects relay WT to timing lead CWT through make contacts 35 of relay TB; transfers the holding ground for relay TA from the local ground to ground provided from timing lead H1 as indicated in Fig. 3; and transfers the connection between front sleeve 20 and back sleeve 37 at break contact 38 of relay TB to a circuit including make contacts 39 of relay TB and make contacts 40 of relay TA.

At time $t_3$ in the second revolution of the interrupter, ground is temporarily removed from timing lead H1, thereby de-energizing relay TA and transferring ground on sleeve conductors 20 and 37 to timing lead H2 at break contacts 47. At time $t_4$ on the third revolution of the interrupter a pulse of ground is applied to lead CWT which results in the energization of relay WT over the previously prepared circuit and the application of warning tone to tip lead T through make contacts 41 of relay WT and break contacts 42 of relay TA.

A second warning tone is transmitted at time $t_5$.

Ground is temporarily removed from lead H2 at time $t_6$ which removes the ground from the back sleeve lead 37 as well as front sleeve lead 20. The removal of ground from the sleeve leads causes de-energization of the circuits of both called and calling ends of the system in a manner well known to those skilled in the art.

It is to be understood that on local calls, there will be no HS or supervisory circuit required between line circuit 4 and adaptor or circuit 11. In connection with toll calls, however, conductor HS is extended between trunk 13 and finder-selector link 5 as indicated by numeral 16 and the HS or supervisory lead is extended from finder-selector link 5 to conversation timing circuit 11 as indicated by numeral 18*a*.

As described above on the extension of a toll call to the finder-selector link 5 resistance battery is applied to HS lead 16 and, therefore, to HS lead 18a into timing apparatus 11. The appearance of battery potential on lead 18a causes energization of relay HSL over a circuit extending from lead 18a through break contacts 43 of relay HSE and break contacts 44 of relay HSL to the lower winding of relay HSL. Relay HSL locks up to local ground through make contacts 45 of relay HSL; disconnects ground from the locking circuits of relays TA and TB at break contacts 32 of relay HSL; opens the above traced operating circuit to the lower winding of relay HSE at break contacts 23 of relay HSL; and transfers the back HS lead 18a from the lower winding of relay HSL to the front HS lead 18 at contacts 44, 46 of relay HSL so that a switch through connection free of all relay attachments in the conversation timer is established between the two HS leads. As a result control and supervisory signals between the calling and called ends of the switch train may now be transmitted over both these leads in series. More particularly, after the connection has been extended to connector 8, Fig. 1, under the control of the dial pulses received over toll line 12, Fig. 1, the connector will be conditioned for toll operation in response to the battery applied to the HS lead by relay 15, Fig. 1, during each digit dialled. Furthermore, the battery applied to the HS lead by relay 17 in the connector upon answering of the toll call by the called party will be returned over the switched through HS lead to trunk circuit 13 to cause this trunk circuit to reverse the current on the toll line and thereby given answering supervision to the toll operator.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, a first group of calling lines, a second group of calling lines, a called line, means for extending a call from a calling line in one of said groups to said called line, a conversation timing device, a first control lead extending from the called end of the extended call to said timing device, a second control lead extending from the calling end of said extended call to said timing device, means at the called end of said first control lead for applying a control potential to said first control lead, means in said timing device responsive to said control potential if said call originated on a line in said first group for closing a starting circuit for said timing device, means at the calling end of said second control lead for setting up a distinctive potential condition on said second lead if the call originated on a line in said second group, and means in said timing device controlled by said potential condition on said second control lead for rendering said timing device ineffective, said last mentioned means also being responsive to said potential condition on the second control lead for connecting said two control leads to each other.

2. In a telephone system, a first group of calling lines, a second group of calling lines, a called line, means for extending a call from a calling line in one of said groups to said called line, a conversation timing device effective to time only calls originating in said first group of calling lines, a first conductor extending from the called end of the extended call to said timing device, a second conductor extending from the calling end of said extended call to said timing device, means at the called end of said first conductor effective upon the anwering of an extended call to apply a control potential to said first conductor, means at the calling end of said second conductor effective prior to the answering of an extended call for setting up a distinctive potential condition on said second conductor if said call originated in the second of said groups, said conversation timing device including a first relay and a second relay normally connected to said first and second conductors respectively, said first relay being responsive to said control potential on the first conductor in the case of a call originating in said first group for causing a starting circuit for said timing device to be closed and said second relay being operative under the control of said potential condition on the second conductor to render said first relay ineffective, said second relay also being responsive to said potential condition on the second conductor for causing said conductors to be connected to each other free of relay attachments in said device.

3. In a telephone system, a first group of calling lines, a second group of calling lines, a called line, means for extending a call from a calling line in one of said groups to said called line, a conversation timing device, a first control lead extending from the called end of the extended call to said timing device, a second control lead extending from the calling end of said extended call to said timing device, means at the called end of said first control lead for applying a control potential to said first control lead, relay means in said timing device responsive to said control potential if said call originated on a line in said first group for closing a starting circuit for said timing device, means at the calling end of said second control lead for setting up a distinctive potential condition on said second lead if the call originated on a line in said second group, and relay means in said timing device controlled by said potential condition on said second control lead for rendering said timing device ineffective, said last mentioned relay means also being responsive to said potential condition on the second control lead for connecting said control leads to each other free of all relay attachments in said device.

4. In a telephone system, a first group of calling lines, a second group of calling lines, a called line, means for extending a call from a calling line in one of said groups to said called line, a conversation timing device, a first control lead extending from the called end of the extended call to said timing device, a second control lead extending from the calling end of said extended call to said timing device, means at the called end of said first control lead effective upon the answering of an extended call to apply a control potential to said first control lead, means in said timing device responsive to said control potential if said call originated in the first of said groups for closing a starting circuit for said timing device, means at the calling end of said second control lead effective prior to the answering of an extended call if said call originated in the second of said groups for applying a control potential to said lead, and means in said timing device controlled by said potential on the second control lead for rendering said timing device ineffective, said last mentioned means also being responsive to said potential condition on the second control lead for connecting said two control leads to each other.

5. In a telephone system, a first group of calling lines, a second group of calling lines, a called line, means for extending a call from a calling line in one of said groups to said called line, a conversation timing device effective to time only calls originating in said first group of calling lines, a first conductor extending from the called end of the extended call to said timing device, a second conductor extending from the calling end of said extended call to said timing device, means at the called end of said first conductor effective upon the answering of an extended call to apply a control potential to said first conductor, means at the calling end of said second conductor effective prior to the answering of an extended call for setting up a distinctive potential condition on said second conductor if said call originated in the second of said groups, said conversation timing device including a first relay and a second relay normally connected to said first and second conductors respectively, said first relay being responsive to said control potential on the first conductor in the case of a call originating in said first group for causing a starting circuit for said timing device to be closed and also responsive to said control potential on the first conductor for causing said conductors to be connected to each other free of relay attachments in said device, and said second relay being operative under the control of said potential condition on the second conductor to render said first relay ineffective.

6. In a telephone system, a first group of calling lines, a second group of calling lines, a called line, means for extending a call from a calling line in one of said groups to said called line, a conversation timing device effective to time only calls originating in said first group of calling lines, a first conductor extending from the called end of the extended call to said timing device, a second conductor extending from the calling end of said extended call to said timing device, means at the called end of said first conductor effective upon the answering of an extended call to apply a control potential to said first conductor, means at the calling end of said second conductor effective prior to the answering of an extended call for setting up a distinctive potential condition on said second conductor if said call originated in the second of said groups, said conversation timing device including a first relay and a second relay, said first relay having a winding normally connected to said first conductor under the control of said second relay, said second relay having a winding normally connected to said second conductor under the control of said first relay, said first relay being responsive to said control potential on the first conductor in the case of a call originating in said first group for causing a starting circuit for said timing device to be closed and said conductors to be connected to each other free of relay attachments in said device, and said second relay being operative under the control of said potential condition on the second conductor to render said first relay ineffective and cause said conductors to be connected to each other free of relay attachments in said device.

7. In a telephone system, a first group of calling lines, a second group of calling lines, a called line, means for extending a call from a calling line in one of said groups to said called line, a conversation timing device effective to time only calls originating in said first group of calling lines, a first conductor extending from the called end of the extended call to said timing device, a second conductor extending from the calling end of said extended call to said timing device, means at the called end of said first conductor effective upon the answering of an extended call to apply a control potential to said first conductor, means at the calling end of said second conductor effective prior to the answering of an extended call for setting up a distinctive potential condition on said second conductor if said call originated in the second of said groups, said conversation timing device including a first relay and a second relay, said first relay having a winding normally connected to said first conductor under the control of said second relay, said second relay having a winding normally connected to said second conductor under the control of said first relay, said first relay being responsive to said control potential on the first conductor in the case of a call originating in said first group for closing a starting circuit for said timing device, closing a locking circuit for itself, disconnecting both of said relay windings from said conductors and connecting both said conductors to each other, and said second relay being operative under the control of said potential condition on the second conductor to disconnect said winding of the first relay from said first conductor for rendering said relay effective, close a locking circuit for said second relay, disconnect said winding of the second relay from said second conductor and connect said conductors to each other.

8. In a telephone system, a first circuit terminating a calling local line, a second circuit terminating a calling toll line, a called line, a connector having access to said called line, a conversation timing device effective to time only calls from said second calling circuit, a switch train for extending a call from one of said two calling circuits through said conversation timing device to said connector, a first control lead extending from said connector to said timing device, a second control lead extending from said second calling circuit to said timing device, means in said connector effective to apply a control potential to said first control lead upon answering of said call over said called line, means in said second circuit effective if the call originated from said toll line to apply a control potential to said second control lead prior to answering, said timing device including relay means responsive to said control potential on the first control lead if the call originated from said local line for closing a starting circuit for said timing device and relay means responsive to said control potential on the second control lead for rendering said first mentioned relay means ineffective and causing said control leads to be switched through free of all relay attachments in said timing device.

FRANK KESSLER.

REFERENCES CITED

The following references are of record in the file of this patent:

UNITED STATES PATENTS

| Number | Name | Date |
|---|---|---|
| 1,694,170 | Friendly | Dec. 4, 1928 |
| 1,696,275 | Johnson et al. | Dec. 25, 1928 |
| 2,025,880 | McDavitt | Dec. 31, 1935 |
| 2,427,000 | Hovland | Sept. 9, 1947 |
| 2,490,221 | Lomax | Dec. 6, 1949 |